Nov. 23, 1954      M. S. WEISS      2,695,180
HITCH ATTACHMENT FOR BALERS
Filed March 24, 1951      4 Sheets-Sheet 1
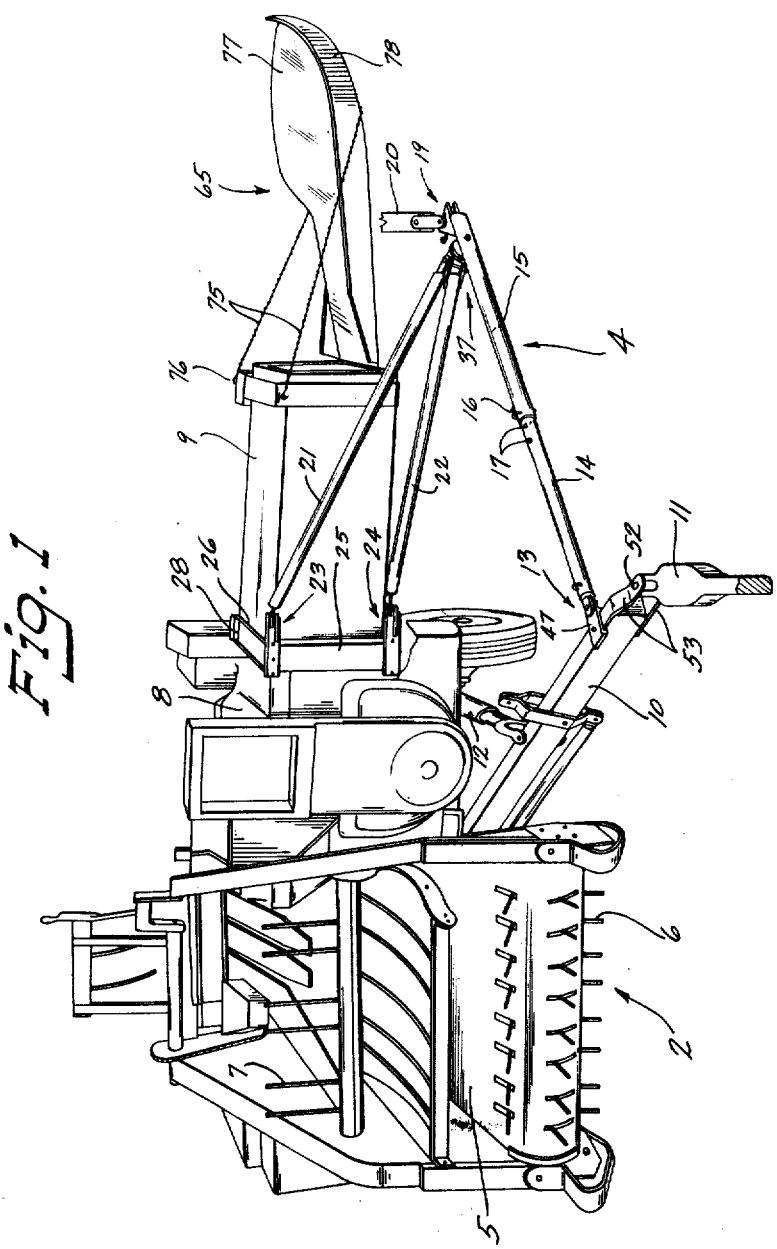
INVENTOR.
Melvin S. Weiss
BY Andrus & Sceales
Attorneys

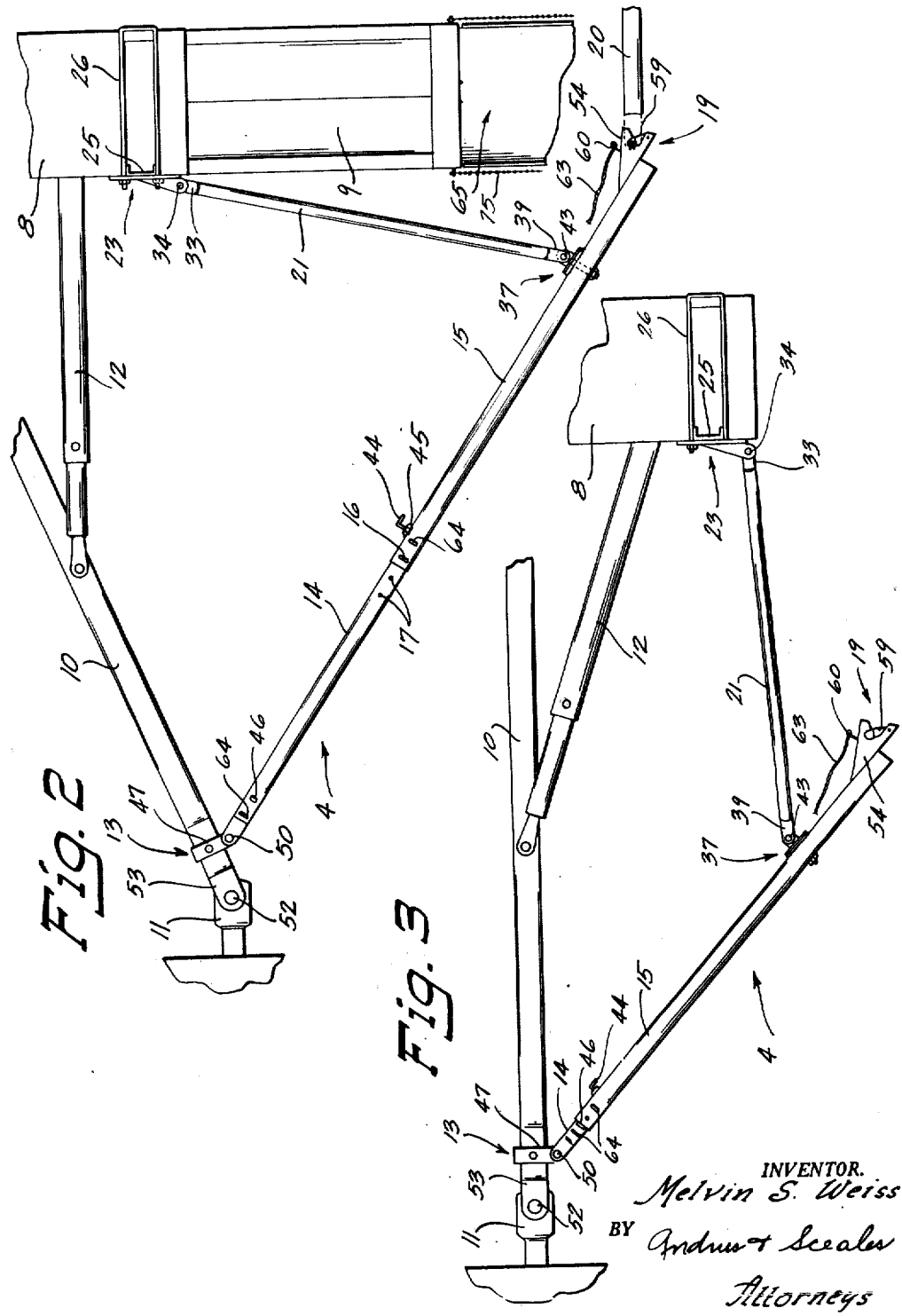

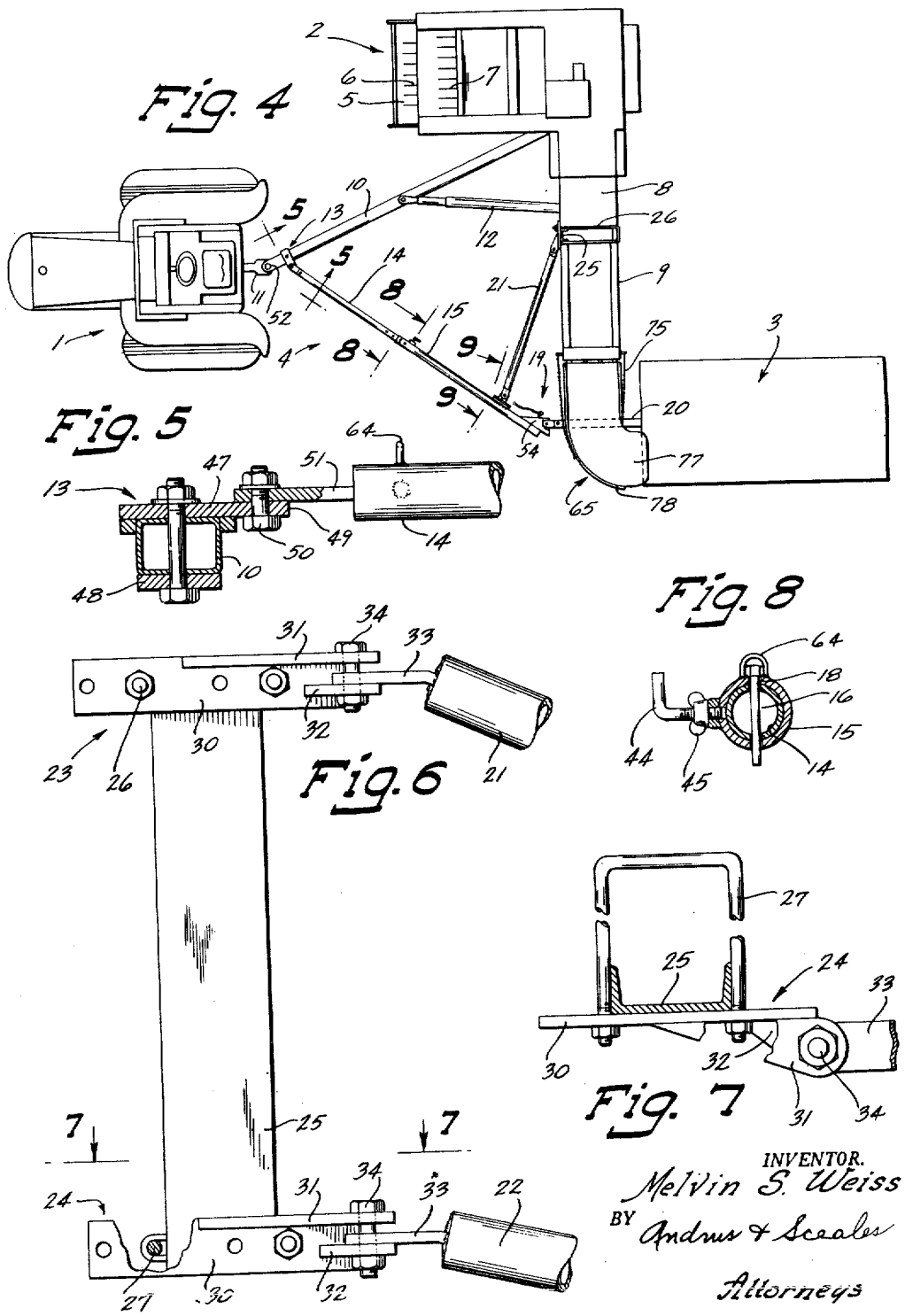

Nov. 23, 1954
M. S. WEISS
2,695,180
HITCH ATTACHMENT FOR BALERS
Filed March 24, 1951
4 Sheets-Sheet 4
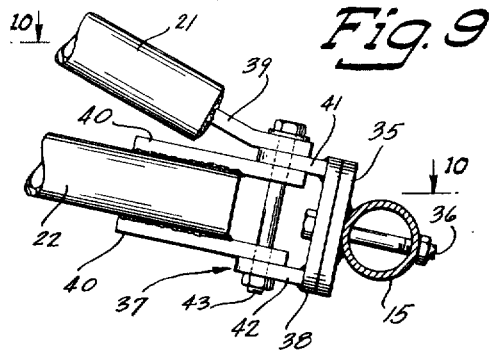
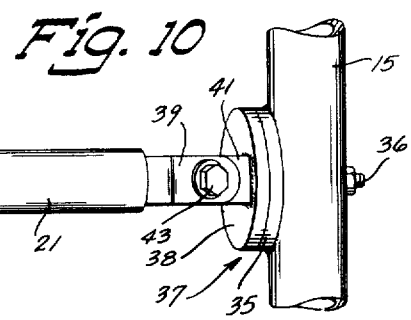
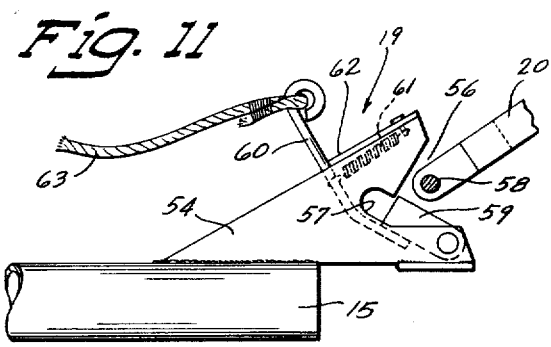
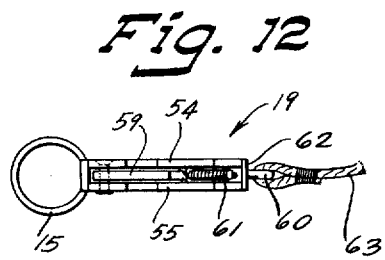
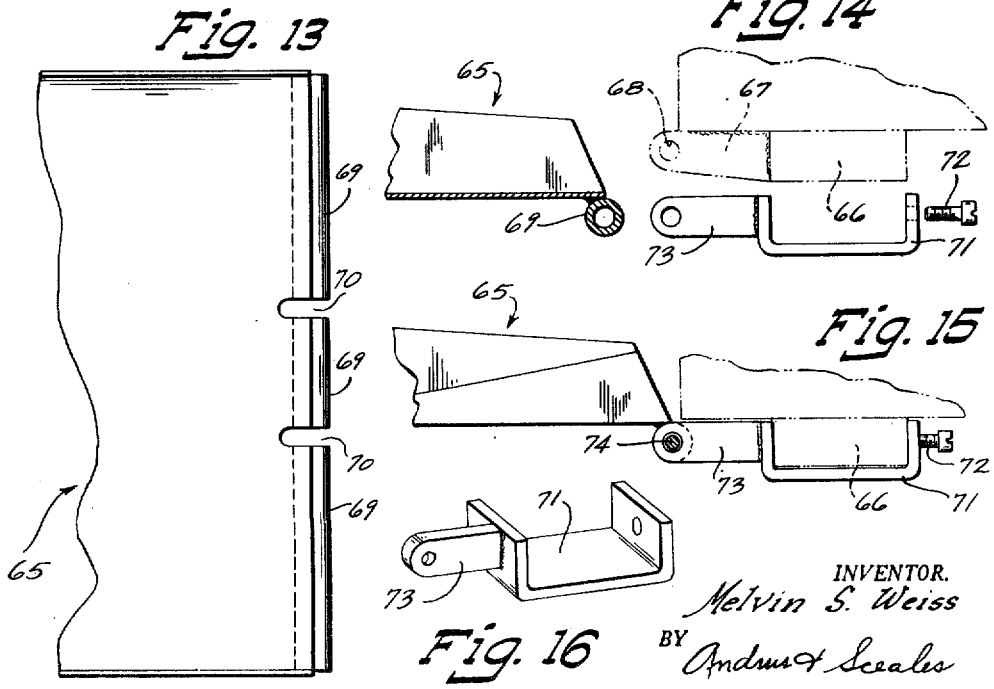
INVENTOR.
Melvin S. Weiss
BY Andrus & Seales
Attorneys

United States Patent Office 2,695,180
Patented Nov. 23, 1954

2,695,180

HITCH ATTACHMENT FOR BALERS

Melvin S. Weiss, Glenbeulah, Wis.

Application March 24, 1951, Serial No. 217,367

5 Claims. (Cl. 280—413)

This invention relates to hitch attachments for balers and more particularly to hitch attachments used with automatic balers of the side-discharge type.

An object of the invention is to provide an improved hitch for side-discharge balers which permits a tractor to draw both the baler and a wagon or other bale receiving vehicle in correct operating relation.

A further object is to provide a hitch adapted to couple a tractor, automatic baler and wagon for unitary side-discharge baling operation while being further adapted to fold to a transport position whereby the tractor and baler remain coupled and the entire hitch is disposed substantially within the transverse dimensional limits of the tractor and baler.

A further object of the invention is to provide a hitch for coupling a tractor, automatic baler and wagon for unitary side-discharge baling operation whereby, upon disconnection of the wagon at the completion of a baling operation, the hitch may be transported while remaining coupled to the tractor and baler without interfering with lengthwise alignment of the same for convenience of transport.

A further object is to provide a hitch for coupling a tractor, baler, and wagon for unitary baling operation which permits relocation of the same in a variety of operating relations without requiring that they be uncoupled.

A further object of the invention is to provide a hitch for unitary coupling of a tractor, baler, and wagon wherein the hitch members are interconnected to permit their terminal ends freedom for independent vertical floating movement in response to vertical relocation of the coupled vehicles. Such floating freedom is especially required where uneven terrain is encountered.

A further object of the invention is to provide a hitch adapted for interchangeable use with balers, tractors, and wagons which are normally coupled in varying operating relations.

A further object is to provide a hitch for unitary coupling of a tractor, baler, and wagon which may be readily installed in the field with a minimum use of tools and without the need for forming special attachment apertures in the vehicles.

A further object is to provide a vertically adjustable, readily applied bale chute for cooperation with a wagon drawn alongside a side-discharge baler.

A further object is to provide a hitch for unitary coupling of a tractor, baler, and wagon having a release mechanism disposed between the hitch and wagon whereby the tractor operator may readily release and replace the wagon at any time during the baling operation.

In operating an automatic side-discharge driven vehicle, such as a baler, it is often desired to draw a wagon alongside the bale case or bale chute to receive and collect the bales. Where it is desired to draw both the baler and wagon by a driving vehicle, such as a common tractor, a special hitch mechanism must connect the three vehicles during the baling operation. To avoid the need for removing the hitch during transport of the tractor due to its extension transversely of the baler for connection to the wagon, the hitch of the present invention is adapted to fold alongside the baler pick-up whereby the hitch will not interfere with passage of the vehicles through narrow openings and over highways.

Briefly, the hitch comprises a pair of aligned telescopic and rearwardly extending draw members pivotally connected to the baler draw bar at their forward end and with the wagon draw bar at their rear end. One or more substantially transversely extending support arms are pivotally connected at opposite ends to the side-discharge bale case and to the rear end of the telescopic draw members near the latter's wagon connection. The connection of the support arms to the rear end of the telescopic draw members provides for pivotal movement of the latter in both horizontal and vertical planes whereby the terminal ends of the hitch can float vertically to compensate for relative vertical relocation of the wagon and baler draw bars to which they are attached.

The pivotal connections between the baler draw bar and the forward end of the telescopic draw members, and between the support arms, baler case, and rear end of the telescopic draw members, permit the hitch to be laterally and forwardly folded against the side of the baler upon disconnection of the wagon. The draw members comprising the hitch may telescopically overlap along substantially their entire lengths to compensate for forward movement of their point of connection with the support arms upon folding of the hitch.

The invention provides a special vertically adjustable bale chute for attachment to the bale case. The chute is adapted to accurately guide bales to the wagon drawn by the tractor and hitch during operation of the unit.

A wagon release mechanism is carried by the rear end of the telescopic draw members and is adapted to permit the tractor operator to release and replace the wagon at any time during the baling operation.

These and other objects of the invention will appear hereinafter in connection with the following description of the drawings illustrating an embodiment of the invention.

In the drawings:

Figure 1 is a perspective view of the hitch of the present invention shown connected to a side-discharge baler;

Fig. 2 is a top plan view of the hitch as disposed in extended operating position;

Fig. 3 is a top plan view of the hitch as disposed in folded transport position;

Fig. 4 is a top plan view of the hitch in operating position shown connected with a baler, tractor, and wagon;

Fig. 5 is an enlarged detail sectional view taken along line 5—5 of Fig. 4 showing the connection between the hitch and the baler draw bar;

Fig. 6 is an enlarged detail elevational view with parts broken away showing the supporting channel and brackets for connection of the hitch to the bale case;

Fig. 7 is a detail sectional view with parts broken away taken along line 7—7 of Fig. 6;

Fig. 8 is an enlarged detail sectional view taken along line 8—8 of Fig. 4 showing the connection between the telescopic draw members;

Fig. 9 is an enlarged detail sectional view taken along line 9—9 of Fig. 4 showing the connection between the rearward telescopic draw member and the support arms extending from the baler;

Fig. 10 is a detail sectional view taken along line 10—10 of Fig. 9;

Fig. 11 is an enlarged detail plan view of the wagon hitch release mechanism;

Fig. 12 is an enlarged detail elevational view of the wagon hitch release mechanism;

Fig. 13 is an enlarged broken top plan view of the bale chute showing the portion adjacent the bale case extension;

Fig. 14 is an enlarged side elevational view of the rear of the bale chute exploded from a bale chute support bracket. The outward end of the bale case is shown in phantom;

Fig. 15 is a view similar to Fig. 14 showing the bale case, bale chute, and a bale chute supporting bracket in coupled positions; and Fig. 16 is an enlarged perspective view of a bale chute supporting bracket.

Referring to the drawings, Fig. 4 shows a tractor 1, a driven vehicle, such as a baler 2, and wagon 3 joined together in unitary operating relation by a hitch 4. The baler is of the side-discharge type having a pick-up deck 5, pick-up and feeder arms 6 and 7, a laterally extending bale case 8 and bale case extension 9. A baler draft tongue or draw bar 10 joins the baler to the hitch 11 of tractor 1. Draw bar 10 may be rigidly disposed at a plurality of angular positions relative to tractor 1 and baler 2 by a telescopic draw bar bracing arm 12 extending from near the center of draw bar 10 to the baler axle housing not shown. The draw bar 10 and trailing arm 12 are pivoted at their inner ends to the main frame of the baler in a manner well known in the art, but not shown in the drawings, so that both the draw bar and arm 12 may be swung horizontally. In service, the draw bar is held in a predetermined fixed position, to which it is swung by the operator, by the telescopic bracing arm 12 when the arm 12 is locked in a fixed telescoped position by inserting a pin through the arm 12. The baler shown is of the type disclosed in U. S. Patent No. 2,499,500 which issued on March 7, 1950.

Hitch 4 is pivotally joined to the baler draw bar 10 near its connection with tractor hitch 11 by a coupling bracket 13 which will be further described and comprises a pair of concentric and telescopic draw members 14 and 15 which extend diagonally rearwardly from bracket 13. The forward draw member 14 is shown of smaller diameter than member 15 with its rear end disposed within the forward end of member 15. In the extended operating position of hitch 4 illustrated in Figs. 1, 2, and 4, the draw members 14 and 15 are joined by bolt 16 extending through aligned apertures 17 and 18, respectively formed in members 14 and 15. A plurality of apertures 17 are provided in draw member 14 to permit selective adjustment to a desired extended telescopic position.

The rear end of draw member 15 is provided with a wagon release mechanism 19 to be further described. Release mechanism 19 is joined to the draw bar 20 of wagon 3.

Support for hitch 4 is afforded by upper and lower support arms 21 and 22 which extend from bale case 8 to near the rear of hitch draw member 15.

Support arms 21 and 22, as best shown in Figs. 1, 6, and 7, are pivotally secured to bale case 8 by upper and lower arm support brackets 23 and 24, respectively carried by a vertically disposed channel member 25 which has its side flanges abutting bale case 8. The brackets 23 and 24 and channel 25 are shown secured to bale case 8 by upper and lower U-bolts 26 and 27 which respectively wrap around upper rib 28 and a lower rib, not shown, but carried by the bale case. The ends of U-bolts 26 and 27 are threaded to receive nuts which serve to draw the U-bolts tightly about their respective ribs and press brackets 23 and 24 and channel 25 against the side of bale case 8.

Support brackets 23 and 24 each comprise vertically disposed body sections 30, upper horizontally extending ears 31 and lower horizontal ears 32. Support arms 21 and 22 each have their ends adjacent the bale case 8 provided with tongues 33 which are welded internally of the arms. Tongues 33 are pivotally mounted between ears 31 and 32 of their respective support bracket 23 or 24 by bolts 34. Ears 31 and 32 are spaced a greater distance than the thickness of tongues 33 to permit some vertical movement of the support arms 21 and 22.

The outer ends of support arms 21 and 22 are connected with the rear draw member 15 so as to permit pivotal movement therebetween both in horizontal and vertical planes.

As best shown in Fig. 9, draw member 15 carries a circular disk 35 which is welded to the side thereof facing baler 2. A bolt 36 passes through draw member 15 and secures a pivot bracket 37 having a disk shaped side portion 38 in abutting relation to disk 35. Disks 35 and 37 are thus mounted for relative substantially vertical pivotal movement about bolt 36.

The outer end of support arm 21 is provided with tongue 39 and the outer end of support arm 22 is provided with spaced tongues 40. The respective tongues are welded to the arms and extend to pivot bracket 37 to be pivotally held against upper and lower ears 41 and 42 of bracket 37 by a bolt 43. The tongue 39 of upper support arm 21 is held between the head of bolt 43 and upper ear 41. The two tongues 40 of lower support arm 22 are spaced to abut opposite faces of ears 41 and 42 between the same. Support arms 21 and 22 are thus free to pivot in a substantially horizontal plane relative to both baler 2 and hitch draw members 14 and 15.

As shown in Fig. 3, hitch 4 is folded to transport position after releasing wagon 3 from the rear end of draw member 15, removing the bolt 16 between draw members 14 and 15, and causing the members 14 and 15 to telescope together whereby support arms 21 and 22 pivot about bale case 8. When draw bar 10 of baler 2 is swung inwardly to align with the baler pick-up deck 5 for transport of the baler, tractor 1 then being more directly ahead of baler 2, the outer ends of support arms 21 and 22 lie substantially in the path of the outer end of bale case 8, and hitch 4 does not project laterally from the baler so as to interfere with transport of the baler 2 by tractor 1 down highways or through gates.

Hitch 4 is held in folded position by an L-bolt 44 which is threaded through a boss formed near the inner end of draw member 15. Bolt 44 is held by a wing nut 45 against draw member 15 to hold members 14 and 15 in telescoped position. A stop tab 46 projects upwardly from near the inner end of member 14 to limit the telescoping of the draw members.

Draw member 14 is secured to draw bar 10 of baler 2 by coupling bracket 13, as stated above. Bracket 13, shown in detail in Fig. 5, comprises a channel shaped clamp 47 which is drawn downwardly about the top of draw bar 10 by a bolt which extends through clamp 47, draw bar 10, and a pressure plate 48 abutting the bottom of bar 10. Clamp 47 has a laterally projecting arm portion 49 which is pivotally secured by a bolt 50 to a tongue 51 welded centrally of the inner end of draw member 14.

Referring to Figs. 1 and 4, tractor 1 is attached to baler draw bar 10 by a bolt 52 which extends between tongues 53 at the end of the bar. The coupling bracket 13 may alternately be disposed forwardly to rest upon the upper tongue 53 with its bolt substituted for bolt 52 carried by the tongues 53. This latter disposition of bracket 13 is preferred where the baler draw bar 10 contains a power take-off shaft with which the bolt of bracket 13 would interfere if disposed, as shown in Figs. 1 and 4.

Referring to Fig. 11, the rear end of draw member 15 carries wagon release mechanism 19, as mentioned above. Release mechanism 19 comprises parallel triangularly shaped plates 54 and 55, the forward edges of which are welded to the rear end of draw member 15. The rear edge of each plate 54 and 55 is correspondingly notched to form a wagon hitch entry opening 56 which extends to a recess 57 formed in plates 54 and 55 obliquely of the normal hitched position of the wagon draw bar 20. A bolt 58 carried by the wagon draw bar 20 enters opening 56 and is obliquely directed into recess 57. A spring pressed latch block 59 secured to a latch arm 60 is pivoted to the plates 54 and 55 of release mechanism 19 and is forced counterclockwise from its position shown in Fig. 11 upon entry of bolt 58 into opening 56. Latch block 59 and arm 60 are drawn by a tension spring 61 back to their position in Fig. 11 upon further entry of bolt 58 into recess 57. Bolt 58 is thus locked in recess 57. An upwardly extending stop flange or web 62 carried between plates 54 and 55 of release mechanism 19 limits the clockwise movement of a latch arm 60. Flange 62 further serves as an abutment which retains latch arm 60 and its block 59 when wagon bolt 58 presses against block 59 from within recess 57. Tension spring 61 may be anchored to flange 62 or another portion of release mechanism 19.

Wagon 3 may be released by the operator of tractor 1 at any time during baling by a rope or cord 63 which is secured to latch arm 60 and extends forwardly along hitch draw members 14 and 15 through eyelets 64 carried at the tops of the members. Rope 63 may be disposed anywhere within convenient reach of the tractor operator. By pulling rope 63, the operator pivots latch block 59 counterclockwise permitting wagon bolt 58 to leave recess 57 of the release mechanism 19.

Bales discharged from extension 9 of bale case 8 are guided onto wagon 3 by bale chute 65 pivoted to the end of the extension 9. As shown in Fig. 14, the underside of extension 9 for the baler illustrated is provided with a transverse rib 66 to which one or more chute supporting arms 67 are permanently welded. Each arm 67 is provided with an aperture 68 for alignment with three pipe members 69 welded to the underside of bale chute 65. As shown in Fig. 13, the pipes 69 are spaced as at 70 to receive the arms 67. End clamps 71 (Figs. 14, 15 and 16) are adapted to be disposed against the bale case extension rib 66 and held thereto by set screws 72. Each clamp 71 is provided with an arm 73 corresponding to the arms 67 on bale case extension 9 to be aligned with the outermost ends of chute pipes 69. As shown in Fig. 15, upon alignment, arms 67 and 73 and pipes 69 are joined by a pivot rod 74 about which bale chute 65 may be pivoted.

Bale chute 65 may be pivotally disposed at various angles by chains 75 (Fig. 1) attached to the chute near its outer end and hooked to bale case extension 9 by hook members 76. Alternative elevations of the chute 59 may be obtained by hooking chains 75 on different projections usually present on a bale case extension.

Bale chute 65 is curved rearwardly to have a portion 77 longitudinally aligned with wagon 3. A side flange 78 angularly directs bales onto portion 77 from which they drop to the wagon.

When baler 2 is being prepared for transport, the bale chute 65 may be readily removed from bale case extension 9 by removal of pivot rod 74, or the chute may be folded upwardly against the end of extension 9. Normally both chute 65 and extension 9 are removed from baler 2 during transport.

The described hitch provides a very efficient and practical means of coupling a tractor, baler, and wagon for unitary baling operation. Hitch 4 may be attached to the vehicles with a minimum of tool adjustments and can be folded to transport position in but a few minutes. The bale chute 65 and wagon release mechanism 19 make it possible for a wagon operator to collect bales upon the wagon until the same is loaded and then, if desired, permit additional bales to be deposited upon the ground without interference by the wagon or hitch another wagon to mechanism 19.

The hitch readily folds to transport position and it is flexibly adapted to use with a plurality of desired relative operating positions of the baler, tractor and wagon. Changes in the desired angular position of baler draw bar 10 by adjustment of its bracing arm 12 can be compensated for by telescopic adjustment of hitch draw members 14 and 15. For a given angular position of draw bar 10, the lateral disposition of wagon 3 can be varied by like telescopic adjustment.

The invention may have various embodiments within the scope of the accompanying claims.

I claim:

1. A hitch for unitary coupling of a driven vehicle having a forwardly extending and pivotally connected draw bar attached to a driving vehicle and a wagon disposed to travel a path parallel with and laterally displaced relative to the path of the driven vehicle, which hitch comprises a telescopically adjustable draw member having one end interconnected with the draw bar adjacent the attachment of the draw bar to the driving vehicle and having an outer end connected to the wagon to couple the driven vehicle and the driving vehicle and the wagon in operating relation, and at least one support arm pivotally connected to the draw member adjacent the outer end of the draw member and to the driven vehicle such that the draw member is retracted upon release of the wagon and the support arm is folded forwardly without disconnection from the draw member or driven vehicle to lie substantially parallel to the draw bar for convenience of transporting the driven vehicle.

2. A hitch for unitary coupling of a driven vehicle having a pivotally connected draw bar attached to the driving vehicle and a wagon to travel a path laterally disposed with respect to the driven vehicle, which hitch comprises a telescopically adjustable draw member having one end pivotally attached to the draw bar substantially adjacent the connection of the draw bar to the driving vehicle, and having the opposite end connected to the wagon to couple the wagon to the driven vehicle and the driving vehicle in operative relation with the draw member extended, a rigid support arm pivotally attached to a body portion of the driven vehicle and extending diagonally forward therefrom and pivotally attached to the draw member, the draw member being retracted upon release of the wagon and the support arm simultaneously and automatically folding forwardly to lie substantially parallel to the driven vehicle upon retraction of the draw member to move the draw member and the support substantially wholly within the path of the driven vehicle for convenience of transport.

3. In a hitch for the unitary coupling of a wagon in laterally spaced relation to a driven vehicle connected to a driving vehicle by a draw bar extending rearwardly from the latter, comprising a hitch draw member connected to the draw bar adjacent the connection of the draw bar and the driving vehicle and extending diagonally rearwardly therefrom with the rearward end of the draw member connected to said wagon, at least one rigid support arm pivotally secured to said driven vehicle for horizontal movement and extending substantially laterally thereof with its outer end adjacent said hitch draw member near the latter's wagon connection, and a pivotal connection between said supporting arm and draw member permitting relative floating movement of the latter in a vertical plane in response to changing elevations of the coupled vehicles on uneven terrain.

4. In a hitch for unitary coupling of a wagon in laterally spaced relation to a driven vehicle connected to a driving vehicle by a horizontally movable forwardly extending draw bar, a telescopic draw member connected at one end to the draw bar adjacent the connection of the draw bar and the driving vehicle and extending diagonally rearwardly with the rearward end connected to the wagon, a rigid support pivotally connected to the driven vehicle to permit horizontal swinging of the rigid support and said support extending substantially laterally of the driven vehicle with the outer end disposed adjacent the rearward end of the telescopic draw member, and a pivotal connection between the support and the rearward end of the telescopic draw member to permit relative floating movement in a vertical plane of the draw member in response to changing elevations of the coupled vehicles on uneven terrain, said construction permitting telescopic retraction of the draw member upon release of the wagon and the automatic folding of the support into substantially parallel relation to the driven vehicle for convenience of transport of the driven vehicle.

5. A hitch for the unitary coupling of a wagon in laterally spaced relation to a driven vehicle having a forwardly extending and horizontal movable draw bar connected at its outer end to a driving vehicle, which hitch comprises a telescopically adjustable draw member connected at one end to the draw bar immediately adjacent the connection of the draw bar to the driving vehicle, said adjustable draw member extending diagonally rearwardly and having its rearward end connected to the wagon, a rigid lateral support pivotally connected to the driven vehicle and extending diagonally forwardly in a substantially horizontal plane to the rearward end portion of the draw member, a second rigid lateral support pivotally connected to the driven vehicle in upwardly spaced relation to the first named rigid support and extending diagonally forwardly and downwardly to the rearward end of the draw member, a vertically disposed disc pivotally secured to the forward ends of the rigid supports, a second vertically disposed disc secured to the draw member and in abutting relation to the first named disc, and a bolt extending horizontally through the abutting discs to permit relative floating movement of the draw member in a vertical plane in response to changing elevations of the coupled vehicles on uneven terrain, said construction permitting the telescopic retraction of the draw member and the automatic forward folding of the rigid supports to dispose the draw member and the rigid supports substantially wholly within the path of the driven vehicle for convenience of transport upon release of the wagon and longitudinal alignment of the driven vehicle and the tractor.

References Cited in the file of this patent

UNITED STATES PATENTS

| Number | Name | Date |
|---|---|---|
| Re. 19,550 | Johnson | Apr. 30, 1935 |
| 1,922,376 | Krause | Aug. 15, 1933 |
| 1,959,065 | Rosenthal et al. | May 15, 1934 |
| 1,992,429 | Hyman | Feb. 26, 1935 |
| 2,265,061 | Coultas et al. | Dec. 2, 1941 |
| 2,334,415 | Koeller | Nov. 16, 1943 |
| 2,516,646 | Reiter et al. | July 25, 1950 |
| 2,524,669 | Knoblauch | Oct. 3, 1950 |
| 2,529,842 | Jones et al. | Nov. 14, 1950 |
| 2,544,925 | Karlsson et al. | Mar. 13, 1951 |
| 2,634,675 | Heinje | Apr. 14, 1953 |